US 6,505,438 B1

(12) United States Patent
Hsia

(10) Patent No.: US 6,505,438 B1
(45) Date of Patent: Jan. 14, 2003

(54) PROTECTION CAGES AND COMPONENTS FOR GROWING FRUITS

(76) Inventor: Chih-Yu Hsia, 301 Warren Way, Arcadia, CA (US) 91007

( * ) Notice: Subject to any disclaimer, the term of this patent is extended or adjusted under 35 U.S.C. 154(b) by 0 days.

(21) Appl. No.: 10/067,079

(22) Filed: Feb. 4, 2002

(51) Int. Cl.$^7$ ............................................. A01G 13/02
(52) U.S. Cl. ................................................... 47/24.1
(58) Field of Search .......................... 47/24.1, 20.1, 47/29.6, 31, 31.1, 32, 66.3, 66.4, 904; 206/423; 403/119, 113, 52, 339, 340; 119/452, 459, 461

(56) References Cited

U.S. PATENT DOCUMENTS

| 74,434 A | * | 2/1868 | Searls | 403/113 |
|---|---|---|---|---|
| D115,427 S | * | 6/1939 | Schepps | 119/459 |
| 2,614,838 A | * | 10/1952 | Taylor | 119/461 |
| 3,994,262 A | * | 11/1976 | Suchowski et al. | 119/452 |
| 4,827,666 A | * | 5/1989 | Tweddell, III | 249/55 |
| 5,116,255 A | * | 5/1992 | Keeling et al. | 119/475 |
| 5,722,348 A | * | 3/1998 | Phillips et al. | 119/421 |
| 5,974,729 A | * | 11/1999 | Clark | 47/24.1 |

FOREIGN PATENT DOCUMENTS

| DE | 123838 | * | 9/1901 | 47/24.1 |
|---|---|---|---|---|
| GB | 7585 A | * | 2/1898 | 47/24.1 |
| GB | 2215173 A | * | 9/1989 | A01G/1/00 |
| HU | 46358 | * | 8/1909 | 47/24.1 |
| JP | 406178623 A | * | 6/1994 | 47/24.1 |

* cited by examiner

Primary Examiner—Charles T. Jordan
Assistant Examiner—Son T Nguyen

(57) ABSTRACT

A protection cage system for growing fruits defining a half cage which has a upper connection member and a lower connection member on opposite rims of the half cage; the upper connection member being a plate with at least one hole; the lower connection member being a plate with at least an extruding rod on each surfaces of the plate; the rims having optional curved-down regions. In addition, a protection cages for growing fruits consists of two half cages.

6 Claims, 4 Drawing Sheets

PROTECTION CAGES AND COMPONENTS FOR GROWING FRUITS

BACKGROUND OF THE INVENTION

1. Field of the Invention

This invention relates to devices that protect fruits on trees. Specifically this invention relates to protection cages that can be mounted on twigs around growing fruits to protect the fruits from being pecked by birds.

2. Descriptions of the Prior Arts

No prior art related to the protection cages and components for growing fruits was found.

SUMMARY OF THE INVENTION

Birds often peck growing fruits on trees. The fruits being pecked are not only damaged but also usually can not be consumed by people afterwards. One way to prevent this from happening is to wrap paper around the fruits to protect them. However, to wrap fruits with paper requires much time and often becomes unpractical when many fruits need to be wrapped in a short period of time. Therefore, an easy and fast to mount or dismount lightweight protection cage for fruits is sought.

One of the objectives of the current invention is to create a device that is lightweight. The other objective of the invention is to create a device that can be installed or removed quickly and easily.

These and other objects and advantages of the invention, as well as the details of an illustrative embodiment, will be more fully understood from the following specification and drawings.

DRAWING DESCRIPTION

GENERAL DESCRIPTION

Figure 1:
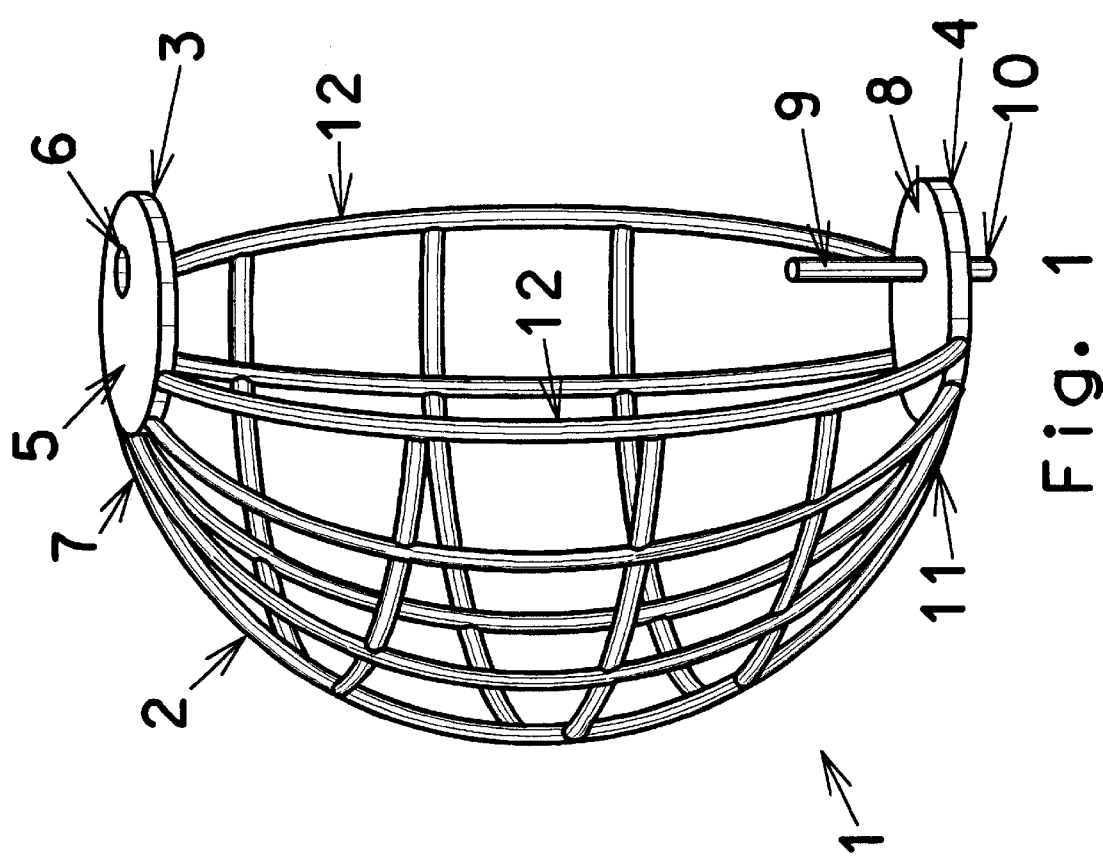
FIG. 1 is an isometric view of a component of the invented protection cage for growing fruits.
Figure 2:
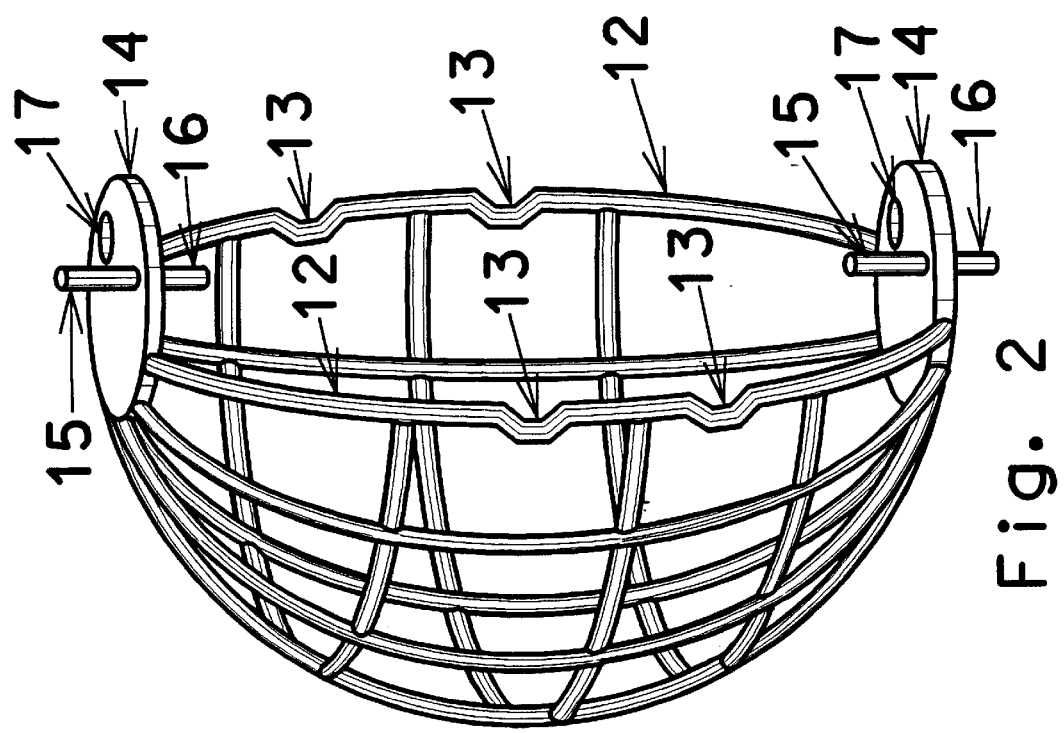
FIG. 2 is an isometric view that illustrates a variation of the component of the invented device.

Referring to FIG. 1, a basic component of the invented protection cage system for growing fruits 1 is a half cage 2 which has a upper connection member 3 and a lower connection member 4. The half cage can be of any shape, although a semi-spherical one is shown, and has rims 12 with sufficient elasticity. The half cage is made of light weight elastic material, such as plastics. The upper connection member is a plate 5 with a hole 6. The upper connection member is attached to a top side 7 of the half cage. The hole 6 is located outside of the half cage but is near its rims. The lower connection member is a plate 8 with two rods, the inward extruding rod 9 and the outward extruding rod 10, on the plate's surfaces. The inward extruding rod 9 is on the surface that faces towards the half cage. The outward extruding rod 10 is on the surface that faces away from the half cage. The lower connection member is attached to a bottom side 11 of the half cage. The inward extruding rod 9 and the outward extruding rod 10 are located outside of the half cage but are near the rims of the half cage. Referring to FIG. 2, the rims 12 of the half cage 2 have optional curved-down regions 13 defining a local recessed dented area on the rims. Normally, the curved-down regions come in pairs, and, the half cage could optional have identical connection members 14 each of which has a pair of extruding rods, 15 and 16, and a hole 17.

Figure 3:
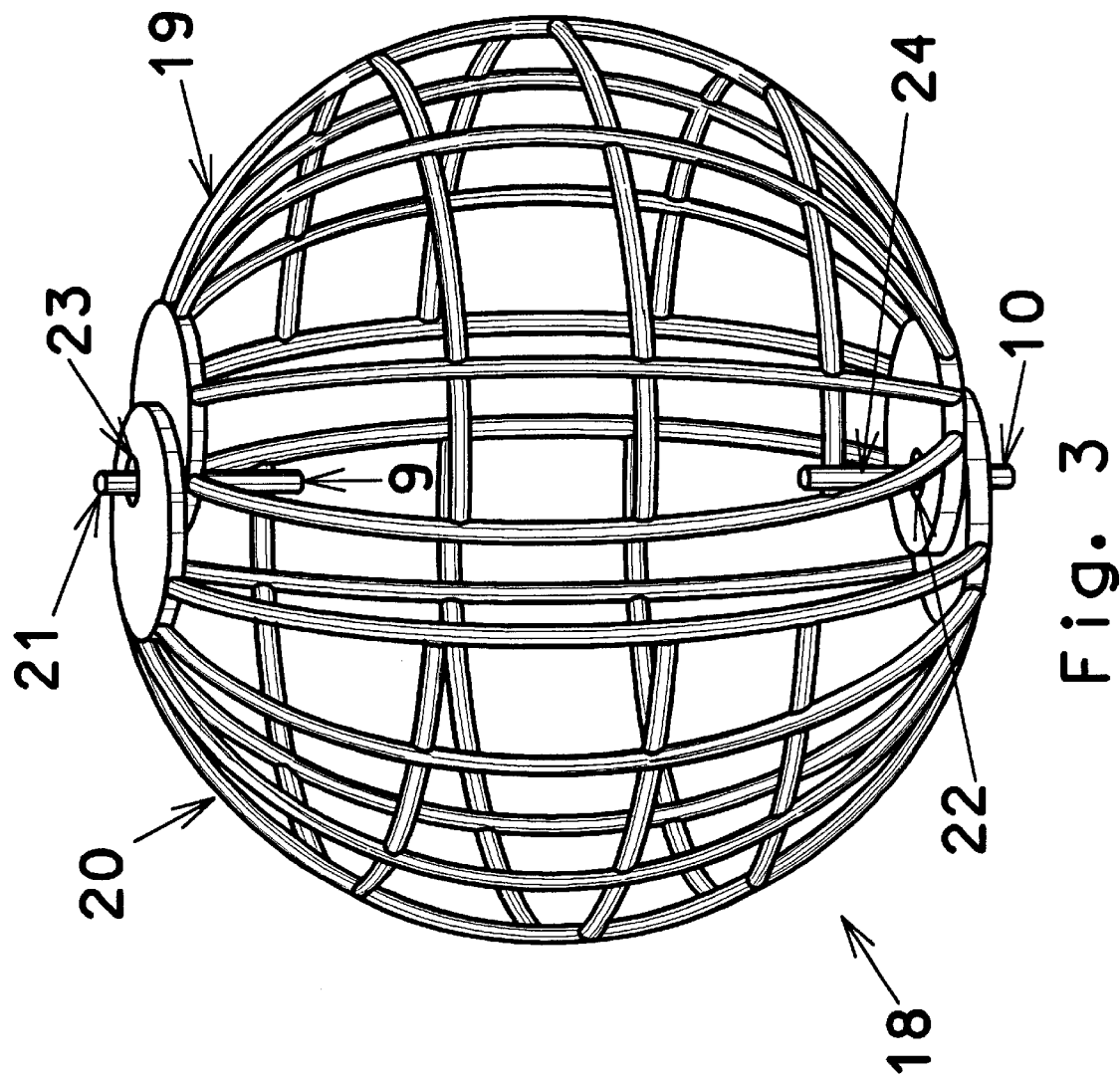
FIG. 3 is an isometric view of the invented protection cage for growing fruits.

Referring to FIG. 3, an invented protection cage system for growing fruits 18 consists of two aforementioned half cages, 19 and 20. The protection cage system is constructed by joining one of the half cage 19 together with the other similar half cage 20, wherein one of the half cage 20 is in the position as shown in FIG. 1 and the other half cage 19 is rotated approximately 180 degree. In joining, the user simply squashes down slightly the half cage 19 and pushes it into the other half cage 20 so that the outward extruding rod 21 and the hole 22 of the half cage 19 engage, respectively, the hole 23 and the inward extruding rod 24 of the other half cage 20. When the squashing is relaxed, the elasticity of the half cage 19 tends to return itself to its original shape. This tendency presses the half cage 19 against the other half cage 20 and keep the two half cages together. The engagements of the holes and the rods prevent the two half cages from slipping apart. A complete protection cage system is therefore constructed. Because the holes, the inward extruding rods and the outward extruding rods are close to the rims of the half cages, the rims of one of the half cage will be close to those of the other half cage. The gaps between the rims of the two half cages will be small.

Figure 4:
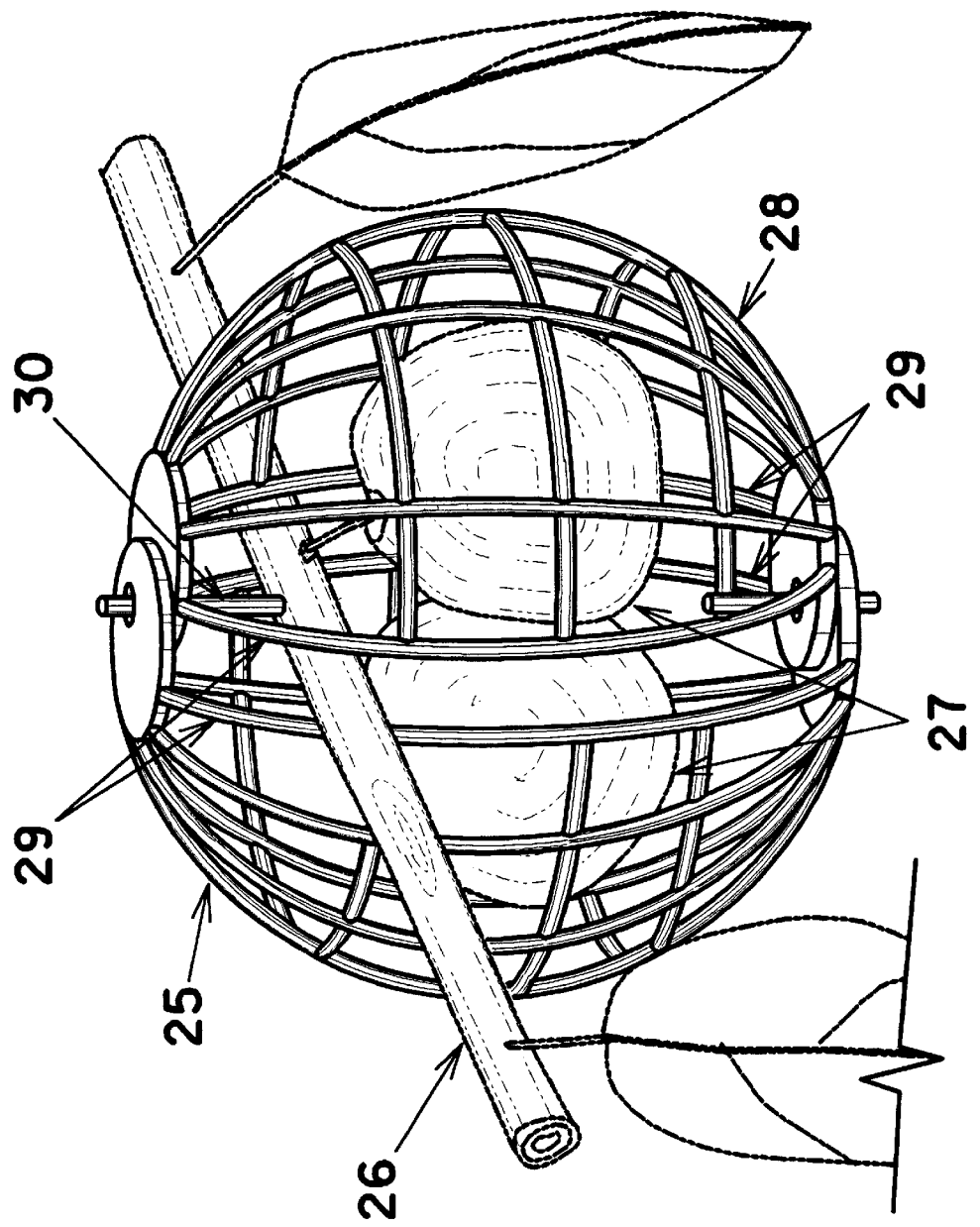
FIG. 4 is an isometric view of the use of the invented protection cage.

Referring to FIG. 4, when using the invented protection cage system, the user puts a half cage 25 on one side of a twig 26 that has the fruits 27 to be protected. The user lets the fruits to be partially inside the half cage and then puts the other half cage 28 on the other side of the twig 26. Then the user constructs the protection cage around the fruits to be protected in the way described in the previous paragraph. Because the small gaps between the rims of the two half cages and the elasticity as well as the thinness of the rims, the rims of the half cages will clamp on the twig but will not break the twig. The protection cage system is then mounted on the twig. A front tip of the inward extruding rod 30 may contact the twig 26 to further limit the downward movements of the protection cage system. The inward extruding rod 30 can also assure that the protected fruits will not be too close to the surface of the protection cage system so that the fruits can not be pecked by birds.

For a large twig, the half cases which rims have the curved-down regions, referring to FIG. 2, will be used. The curved-down regions will facilitate the rims to clamp on the twig without having too much distortions or stresses.

The invented device is easy to mount on and dismount off a twig. To dismount, the user just squashes slightly the upside down half cage, disengages the connecting member, and slides apart the two half cages.

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents, may be resorted to, falling within the scope of the invention as claimed.

I claim:

1. A protection cage system for growing fruits consisting of
   a) a half cage;
   b) said half cage having an upper connection member having a plate and a hole and a lower connection member having a plate and a rod;

c) said upper connection member being on an end of said half cage while said lower connection member being on an opposite end of said half cage;

d) said upper connection member is adapted to engage with a lower connection member of another similar said half cage by rotating said another similar half cage approximately 180 degrees.

2. The protection cage system for growing fruits of claim 1 wherein said rod having a long extruding rod extending from one surface of said plate and a short extruding rod extending from the other surface of said plate.

3. The protection cage system for growing fruits of claim 1 wherein said lower connection member is a plate which has an extruding rod on each surfaces.

4. A protection cage system for growing fruits consisting of
   a) a half cage in dual form;
   b) each said half cage in dual form having a upper connection member having a plate and a hole and a lower connection member having a plate and a rod;
   c) said upper connection member being on an end of said half cage while said lower connection member being on an opposite end of said half cage;
   d) said upper connection member and said lower connection member of one of said half cage in dual form engaging, respectively, said lower connection member and said upper connection member of the other said half cage in dual form.

5. The protection cage system for growing fruits of claim 4 wherein said rod having a long extruding rod extending from one surface of said plate and a short extruding rod extruding from the other surface of said plate.

6. The protection cage system for growing fruits of claim 4 wherein said lower connection member is a plate which has an extruding rod on each surfaces.

* * * * *